US010319963B2

(12) United States Patent
Kubota et al.

(10) Patent No.: US 10,319,963 B2
(45) Date of Patent: Jun. 11, 2019

(54) BATTERY AND METHOD FOR PRODUCING THE SAME

(71) Applicant: SHINKO ELECTRIC INDUSTRIES CO., LTD., Nagano-shi, Nagano (JP)

(72) Inventors: Kazuyuki Kubota, Nagano (JP); Mitsuhiro Aizawa, Nagano (JP); Yoshihiro Ihara, Nagano (JP)

(73) Assignee: SHINKO ELECTRIC INDUSTRIES CO., LTD., Nagano-shi, Nagano (JP)

( * ) Notice: Subject to any disclaimer, the term of this patent is extended or adjusted under 35 U.S.C. 154(b) by 1071 days.

(21) Appl. No.: 14/294,207

(22) Filed: Jun. 3, 2014

(65) Prior Publication Data

US 2014/0370365 A1 Dec. 18, 2014

(30) Foreign Application Priority Data

Jun. 12, 2013 (JP) ................. 2013-123530

(51) Int. Cl.
*H01M 2/02* (2006.01)
*H01M 2/10* (2006.01)
*H01M 10/052* (2010.01)
*H01M 10/0585* (2010.01)

(52) U.S. Cl.
CPC ....... *H01M 2/1072* (2013.01); *H01M 2/0207* (2013.01); *H01M 2/0245* (2013.01); *H01M 2/0267* (2013.01); *H01M 2/1061* (2013.01); *H01M 10/052* (2013.01); *H01M 10/0585* (2013.01)

(58) Field of Classification Search
CPC ............. H01M 2/1072; H01M 2/0207; H01M 2/0245; H01M 2/0267; H01M 10/052; H01M 10/0585; H01M 2/1061; H01M 6/40; H01M 6/46; H01M 2/202; H01M 2/204
USPC ....................................................... 429/156
See application file for complete search history.

(56) References Cited

U.S. PATENT DOCUMENTS

| | | | | | |
|---|---|---|---|---|---|
| 3,557,775 A | * | 1/1971 | Mahoney | ............. | H04R 25/606 600/25 |
| 3,617,387 A | * | 11/1971 | Grulke | ................... | H01M 2/08 429/162 |
| 3,798,070 A | * | 3/1974 | Ruben | ..................... | H01M 4/14 429/130 |
| 5,705,293 A | | 1/1998 | Hobson | | |
| 6,068,947 A | * | 5/2000 | Tuttle | ................... | H01M 2/1044 429/157 |
| 6,387,563 B1 | * | 5/2002 | Bates | .................. | H01M 2/0267 29/623.2 |
| 2006/0062904 A1 | * | 3/2006 | West | ................... | H01M 4/0404 427/126.3 |
| 2008/0179082 A1 | * | 7/2008 | Kinoshita | ......... | H01M 10/4257 174/255 |
| 2009/0214899 A1 | | 8/2009 | Shakespeare et al. | | |
| 2011/0076550 A1 | * | 3/2011 | Liang | .................. | H01M 2/0202 429/175 |
| 2011/0183183 A1 | * | 7/2011 | Grady | ................. | H01M 2/1022 429/152 |
| 2011/0236745 A1 | * | 9/2011 | Brant | ..................... | B01D 71/44 429/145 |
| 2012/0208082 A1 | * | 8/2012 | Honda | .................... | H01M 4/60 429/210 |
| 2014/0170468 A1 | * | 6/2014 | Sasaoka | ............. | H01M 2/1061 429/153 |
| 2014/0227580 A1 | | 8/2014 | Oukassi et al. | | |
| 2015/0303424 A1 | * | 10/2015 | Kubota | ............... | H01M 2/1094 429/121 |

FOREIGN PATENT DOCUMENTS

| | | | |
|---|---|---|---|
| EP | 1 361 256 | * | 11/2003 |
| JP | 2000-315482 | * | 11/2000 |
| JP | A-200-158222 | | 6/2004 |
| JP | A-2010-231969 | | 10/2010 |
| JP | 2011-513914 A | | 4/2011 |
| JP | A-2012-204160 | | 10/2012 |
| WO | WO-A1-2012-156315 | | 11/2012 |
| WO | WO 2013/008321 | * | 1/2013 |

OTHER PUBLICATIONS http://www.azom.com/properties.aspx?Article I D=1179 accessed Apr. 24, 2017.*
Machine translation of JP 2000-315483, published on Nov. 14, 2000 (Year: 2000).*
Polyvinylidenechloride (PVDC)—Properties and Applications—Supplied Data by Goodfellow, May 26, 2003 (Year: 2003).*
JP Notification of Reasons for Refusal dated Feb. 7, 2017 that issued in JP patent application No. 2013-123530, along with its English-language translation.
A Japanese Office Action (with English-language translation) dated Jul. 11, 2017 that issued in Japanese patent application No. 2013-123530.

* cited by examiner

*Primary Examiner* — Anca Eoff
(74) *Attorney, Agent, or Firm* — Drinker Biddle & Reath LLP

(57) ABSTRACT

A battery includes a supporting substrate, resin layers, and a plurality of cells. Each resin layer includes a first resin and has 0.5 MPa to 10 MPa in tensile strength. The cells are stacked on the supporting substrate with the resin layers between the cells.

12 Claims, 12 Drawing Sheets

BATTERY AND METHOD FOR PRODUCING THE SAME

CROSS-REFERENCE TO RELATED APPLICATION(S)

This application claims priority from Japanese Patent Application No. 2013-123530, filed on Jun. 12, 2013, the entire contents of which are herein incorporated by reference.

BACKGROUND

1. Technical Field

Exemplary embodiments of the invention relate to a battery and a method for manufacturing the same.

2. Related Art

For example, US 2009/0214899 A1 and U.S. Pat. No. 5,705,293 describe a thin cell including, on a substrate, an anode current collector, a cathode current collector, a cathode material located on the cathode current collector, an anode material connected to the anode current collector, and an electrolyte layer formed between the cathode material and the anode material.

SUMMARY

However, thin cells described in US 2009/0214899 A1 and U.S. Pat. No. 5,705,293 may not always provide sufficient capacity and voltage.

One exemplary embodiment of the invention provides a battery having sufficient capacity and voltage, and a method for manufacturing the battery.

According to one aspect of exemplary embodiments, a battery includes a supporting substrate, resin layers, and a plurality of cells. Each resin layer includes a first resin and has 0.5 MPa to 10 MPa in tensile strength. The cells are stacked on the supporting substrate with the resin layers between the cells.

Also, according to another aspect of the exemplary embodiments, a method for manufacturing a battery includes stacking a plurality of cells on a supporting substrate with resin layers between the cells. Each resin layer includes a first resin. The resin layers have 0.5 MPa to 10.0 MPa in tensile strength.

With the disclosed battery and method of manufacturing it, it is possible to provide a battery having a sufficient capacity and voltage, and a method of manufacturing it.

DETAILED DESCRIPTION

[First Embodiment]

Figure 1:
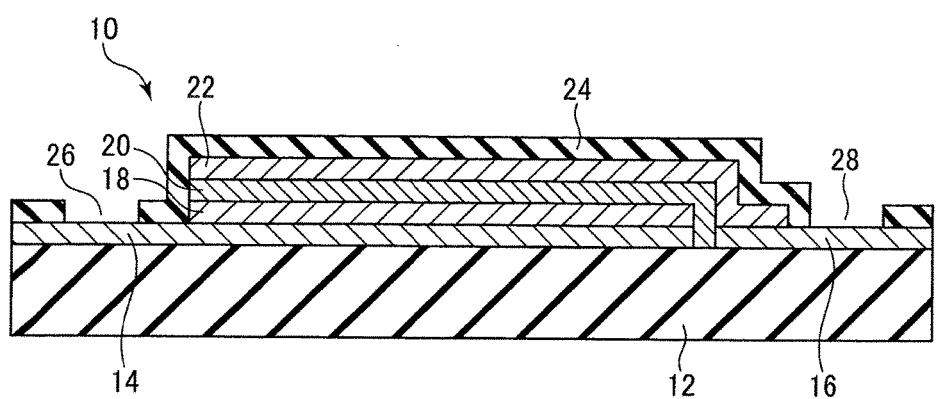
FIG. 1 is a section view showing a thin cell used in a first embodiment.
Figure 2A:
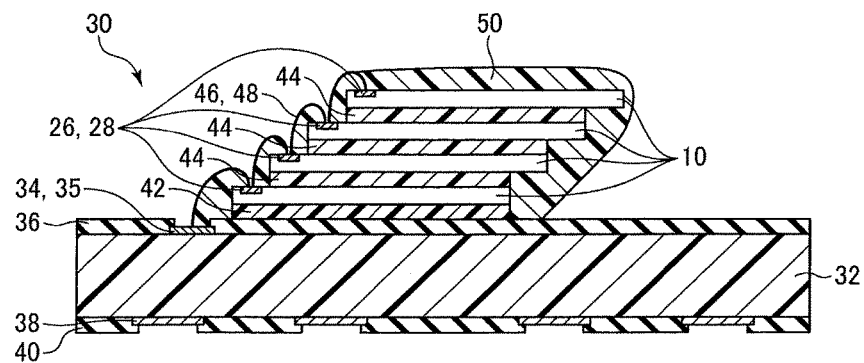
FIGS. 2A and 2B are section and perspective views showing a battery of the first embodiment, respectively.
Figure 2B:
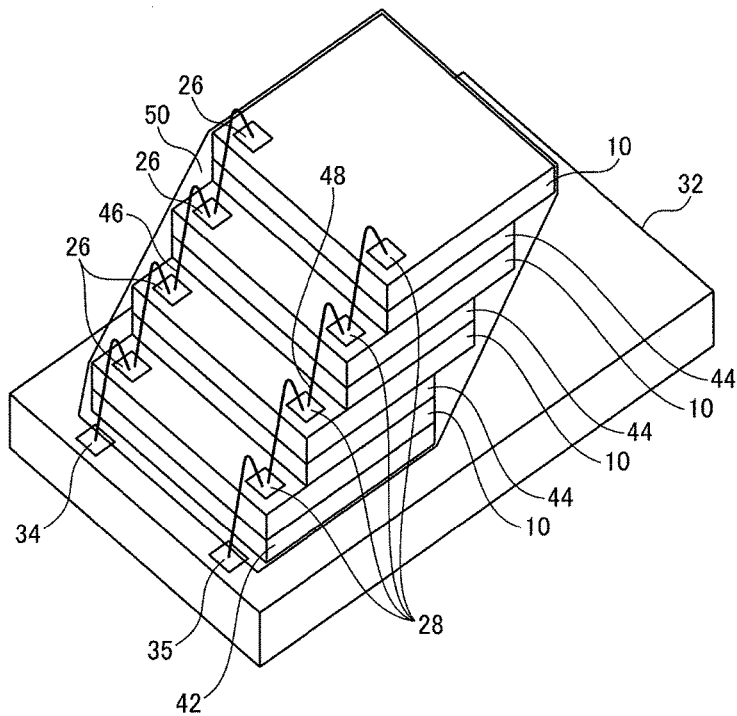
Figure 3:
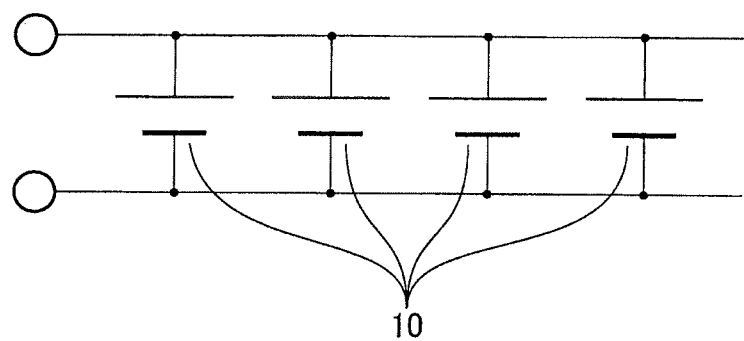
FIG. 3 is a circuit diagram of the battery of the first embodiment.

A battery of a first embodiment will be described with reference to FIGS. 1 to 3. FIG. 1 is a section view showing a thin cell used in the battery of the first embodiment. FIGS. 2A and 2B are section and perspective views showing the battery of the first embodiment, respectively. FIG. 3 is a circuit diagram of the battery of the first embodiment.

The battery of the first embodiment is an integrated battery obtained by stacking a plurality of thin cells and electrically connecting the plurality of stacked thin cells to one another.

(Thin Cell)

First, a thin cell used in the battery of the embodiment will be described with reference to FIG. 1.

As shown in FIG. 1, a thin cell 10 is provided with an anode current collector layer 14 and a cathode current collector layer 16 on a supporting substrate 12.

An anode layer 18 is formed on the anode current collector layer 14. An electrolyte layer 20 is formed on the anode layer 18. A cathode layer 22 is formed on the electrolyte layer 20. The cathode layer 22 is connected to the cathode current collector layer 16.

A protective layer 24 covers the entire thin cell 10. A part of a region, over the anode current collector layer 14, of the protective layer 24 is opened, and the opened portion serves as a positive pad portion 26. Also, a part of a region, over the cathode current collector layer 16, of the protective layer 24 is opened, and the opened portion serves as a negative pad portion 28.

The thin cell 10 of the first embodiment has a rectangular shape in a plan view. The positive pad portion 26 and the negative pad portion 28 are placed on one side of the four sides of the rectangular shape.

The thin cell 10 of the first embodiment, for example, has about 3.8 volts in electromotive force and about 50 μAh in capacity.

Materials, thicknesses, and the like of constituent components of the thin cell 10 of the first embodiment will be described below.

The supporting substrate 12 is made of, for example, a material such as sapphire, ceramics, plastic, or a polymer insulator; a semiconductor material such as silicon; a non-semiconductor material; and a conductive material (including copper, stainless steel, aluminum, or the like) containing a combination of a semiconductor and a non-semiconductor material. The supporting substrate 12 has, for example, about 50 to 1,000 μm in thickness.

The anode current collector layer 14 is made of, for example, an electrically conductive material such as copper, aluminum, nickel, iron, gold, silver, platinum, molybdenum, manganese, a metal alloy, conductive ceramics, or a polycrystalline silicon which is heavily doped with an impurity. The anode current collector layer 14 has, for example, about 3 to 5 μm in thickness.

The cathode current collector layer 16 is made of, for example, an electrically conductive material such as copper, aluminum, nickel, iron, gold, silver, platinum, molybdenum, titanium, manganese, a metal alloy, or conductive ceramics, or a conductive semiconductor such as a polycrystalline silicon which is heavily doped with an impurity. The cathode current collector layer 16 has, for example, about 0.1 to 1.0 μm in thickness.

The anode layer 18 is made of, for example, lithium cobalt oxide, lithium manganese oxide, lithium iron phosphate, lithium vanadium oxide, or lithium nickel oxide. The anode layer 18 has, for example, about 1 to 3 μm in thickness.

The electrolyte layer 20 allows ions to move between the anode layer 18 and the cathode layer 22. The electrolyte layer 20 does not conduct electrons. The electrolyte layer 20 may be liquid. The electrolyte layer 20 may be a solid, a semi-solid, or a combination of a porous solid permeable to ions and liquid. The electrolyte layer 20 may be made of an arbitrary electrolyte material such as LiPON. The electrolyte layer 20 has, for example, about 0.1 to 10 μm in thickness.

The cathode layer 22 is made of, for example, a metal such as copper, nickel, or aluminum, lithium, or an alloy of lithium. The cathode layer 22 has, for example, about 1 to 3 μm in thickness.

The protective layer 24 is formed in order to prevent other constituent components of the thin cell 10 from being exposed to water vapor, oxygen, and other environmental contaminants. The protective layer 24 is made of, for example, an organic material such as a silicone, polyimide, epoxy, silicon nitride, or another polymer. The protective layer 24 has, for example, about 0.5 to 1 μm in thickness.

(Battery)

Next, the battery of the first embodiment will be described with reference to FIGS. 2A to 3.

As shown in FIGS. 2A and 2B, the battery 30 of the first embodiment is an integrated battery obtained by stacking a plurality of thin cells 10 on a circuit substrate 32, and electrically connecting the plurality of stacked thin cells 10 to one another.

When charged or discharged, each of the thin cells 10 of the battery 30 of the first embodiment changes in volume. When the thin cell 10 is charged, it expands to increase its volume. Also, when the thin cell 10 is discharged, it shrinks to decrease its volume.

If such thin cells 10 which are caused to change in volume by charging/discharging as described above are stacked with a resin having a high rigidity therebetween, the resin may not be able to absorb the volume change due to charging/discharging of the battery, which may lead to breaking down of the battery.

In the first embodiment, the thin cells 10 are stacked with a resin having a low rigidity between the cells 10. Therefore, the low-rigidity resin absorbs the volume change due to charging/discharging of the battery to prevent the battery from being broken and to realize a battery of high reliability.

Wirings (not shown) are formed in the circuit substrate 32 which serves as a supporting substrate. Electrodes 34, 35 which are connected to the wirings (not shown) are formed on an upper surface of the circuit substrate 32. The upper surface of the circuit substrate 32 is covered by a solder resist layer 36. Partial regions, corresponding to the electrodes 34, 35, of the solder resist layer 36 are opened.

An electrode 38 which is connected to a wiring (not shown) is formed on a lower surface of the circuit substrate 32. The lower surface of the circuit substrate 32 is covered by a solder resist layer 40. A partial region, corresponding to the electrode 38, of the solder resist layer 40 is opened.

The lowermost thin cell 10 is bonded to a predetermined position on the upper surface of the circuit substrate 32 by an adhesive layer 42. Each thin cell 10 has a rectangular shape in a plan view, and the positive pad portion 26 and the negative pad portion 28 are placed on the left side in FIG. 2A.

On or above the thin cell 10 bonded to the upper surface of the circuit substrate 32, the other thin cells 10 are sequentially stacked with the low-rigidity resin (low-rigidity resin layers) 44 between the thin cells 10. The other thin cells 10 are stacked with being sequentially shifted toward the right side in the sheet of FIG. 2A so that the positive pad portions 26 and negative pad portions 28 which are placed on the left sides of the thin cells 10 are not covered by the upper stacked thin cells 10. The low-rigidity resin 44 is interposed between the stacked thin cells 10.

As shown in FIG. 2B, the plurality of stacked thin cells 10 are electrically connected to one another. The positive pad portions 26 of the plurality of stacked thin cells 10 are commonly connected through a wire 46 to the electrode 34 of the circuit substrate 32. The negative pad portions 28 of the plurality of stacked thin cells 10 are commonly connected through a wire 48 to the electrode 35 of the circuit substrate 32.

As a result, as shown in the circuit diagram of FIG. 3, the battery 30 of the first embodiment is configured as a large-capacity battery in which the thin cells 10 are connected in parallel.

The battery 30 of the first embodiment, for example, has about 3.8 volts in electromotive force and about 200 μAh in capacity.

The whole of the plurality of stacked thin cells 10, which are electrically connected to one another, are covered by a low-rigidity resin (low-rigidity resin layer) 50. In the left side of FIG. 2A, the inner side with respect to the wires 46, 48 is filled with the low-rigidity resin 50.

Alternatively, the low-rigidity resin 50 may be provided so as to fill not only the inner side with respect to the wires 46, 48 but also fully cover the wires 46, 48.

The low-rigidity resin 44 which is provided between the plurality of thin cells 10, and the low-rigidity resin 50 which covers the thin cells 10 are made of, for example, a resin having the rubber elasticity, such as silicone, urethane, or polyolefin.

Preferably, the low-rigidity resins 44, 50 have a low rigidity which is sufficient for absorbing the volume change of the thin cells 10 due to charging/discharging, i.e., have a sufficiently low tensile strength. For example, the tensile strengths of the low-rigidity resins 44, 50 are preferably in a range of 0.5 to 10.0 MPa.

In the term "low-rigidity resin," "low-rigidity" means that, after curing, the resin has a low rigidity. Moreover, examples of "low-rigidity resin" include a so-called gel resin.

The adhesive layer 42 which bonds the lowermost thin cell 10 of the plurality of thin cells 10 to the circuit substrate 32 is made of, for example, a resin film or paste of epoxy or the like, or a film or paste in which conductive fillers are contained in a resin such as epoxy.

The rigidity, i.e., the tensile strength of the adhesive layer 42 is higher than those of the low-rigidity resins 44, 50. This is because of the following reason. As shown in FIG. 1, a cell portion which is caused to change in volume by charging/discharging is formed in the upper surface side of each thin cell 10. Therefore, even if the rigidity of the adhesive layer 42 which is located on the lower surface side of the thin cell 10 is high, the battery is not broken. For example, the tensile strength of the adhesive layer 42 is preferably 50 MPa or higher.

According to the first embodiment, as described above, the plurality of thin cells are stacked with the low-rigidity resin between the cells, to thereby make the low-rigidity resin absorb the volume change due to charging/discharging of the battery, to prevent the battery from being broken, and to offer a battery having high reliability.

(First Battery Manufacturing Method)

A first battery manufacturing method of the first embodiment will be described with reference to FIGS. 4A to 5D. FIGS. 4A to 5D are section views showing steps of the first battery manufacturing method of the first embodiment.

Figure 4A:
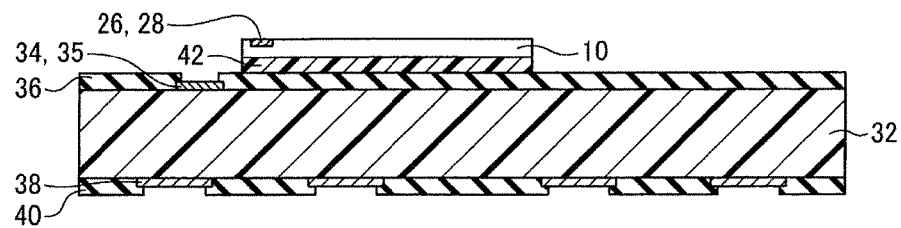
FIGS. 4A to 4D are section views (No. 1) showing steps of a first battery manufacturing method of the first embodiment.

First, the first thin cell 10 is bonded to the predetermined position on the upper surface of the circuit substrate 32 by the adhesive layer 42 (FIG. 4A).

Figure 4B:
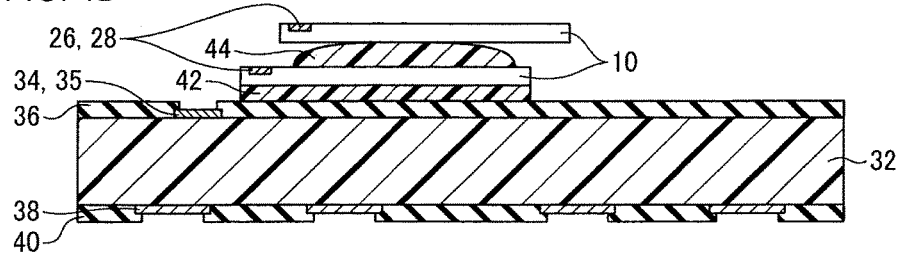

Next, the low-rigidity resin 44 is applied onto the upper surface of the first thin cell 10 bonded to the upper surface of the circuit substrate 32, i.e., a cell-formed surface where the cell portion is formed (FIG. 4B). For example, the low-rigidity resin 44 is dripped onto the cell portion of the first thin cell 10 so as not to cover the positive pad portion 26 and negative pad portion 28 of the first thin cell 10.

Next, the second thin cell 10 which is to be stacked on the first thin cell 10 is positioned while being shifted toward the right side on the sheet of FIG. 4B so that the positive pad portion 26 and negative pad portion 28 of the first thin cell 10 are exposed. Then, the second thin cell 10 is placed on the low-rigidity resin 44 (FIG. 4B).

Figure 4C:
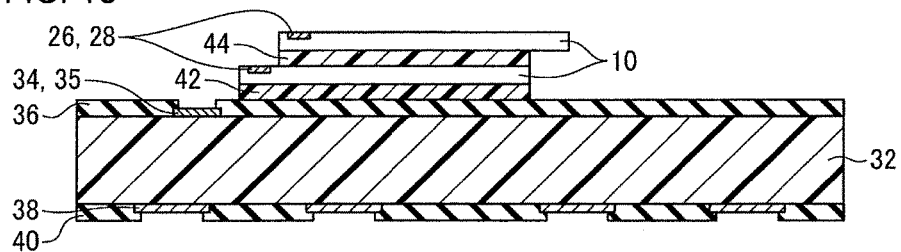

Next, the resulting stacked body is heated to, for example, 50 to 170° C. while pressing the second thin cell 10 from above, to cure the low-rigidity resin 44, so that the second thin cell 10 is stacked on the first thin cell 10 (FIG. 4C).

Figure 4D:
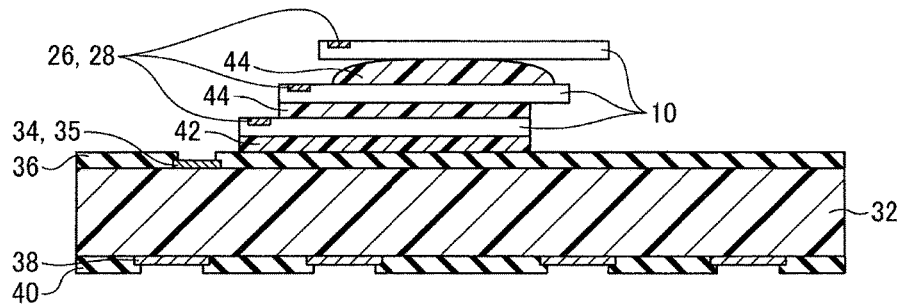

Next, the low-rigidity resin 44 is applied onto the second thin cell 10 (FIG. 4D). For example, the low-rigidity resin 44 is dripped onto the cell portion of the second thin cell 10 so as not to cover the positive pad portion 26 and negative pad portion 28 of the second thin cell 10.

Next, the third thin cell 10 which is to be stacked on the second thin cell 10 is positioned while being shifted toward the right side on the sheet of FIG. 4D so that the positive pad portion 26 and negative pad portion 28 of the second thin cell 10 are exposed. Then, the third thin cell 10 is placed on the low-rigidity resin 44 (FIG. 4D).

Figure 5A:
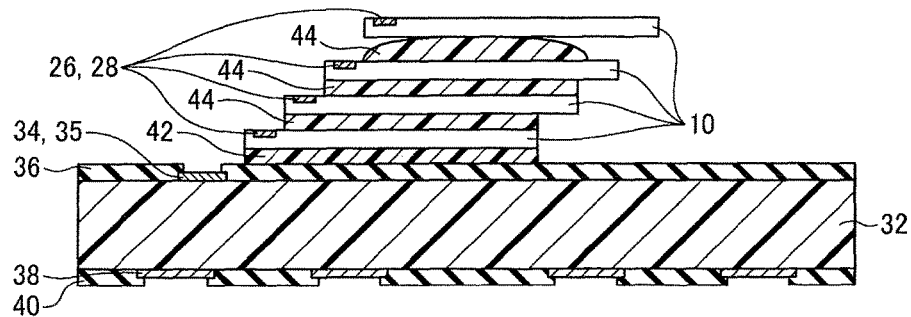
FIGS. 5A to 5D are section views (No. 2) showing steps of the first battery manufacturing method of the first embodiment.

Next, the resulting stacked body is heated to, for example, 50 to 170° C. while pressing the third thin cell 10 from above, to cure the low-rigidity resin 44, so that the third thin cell 10 is stacked on the second thin cell 10 (FIG. 5A).

Next, the low-rigidity resin 44 is applied onto the third thin cell 10 (FIG. 5A). For example, the low-rigidity resin 44 is dripped onto the cell portion of the third thin cell 10 so as not to cover the positive pad portion 26 and negative pad portion 28 of the third thin cell 10.

Next, the fourth thin cell 10 which is to be stacked on the third thin cell 10 is positioned while being shifted toward the right side on the sheet of FIG. 5A so that the positive pad portion 26 and negative pad portion 28 of the third thin cell 10 are exposed. Then, the fourth thin cell 10 is placed on the low-rigidity resin 44 (FIG. 5A).

Figure 5B:
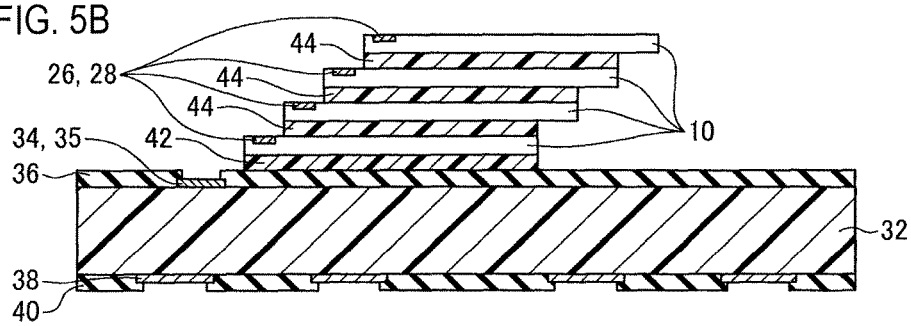

Next, the resulting stacked body is heated to, for example, 50 to 170° C. while pressing the fourth thin cell 10 from above, to cure the low-rigidity resin 44, so that the fourth thin cell 10 is stacked on the third thin cell 10 (FIG. 5B).

After the plurality of thin cells 10 are stacked with the low-rigidity resin 44 between the thin cells 10 in this manner, the plurality of stacked thin cells 10 are electrically connected to one another by using a wire bonding apparatus (not shown).

That is, the positive pad portions 26 of the plurality of stacked thin cells 10 and the electrode 34 of the circuit substrate 32 are connected to one another by the wire 46 using the wire bonding apparatus.

Figure 5C:
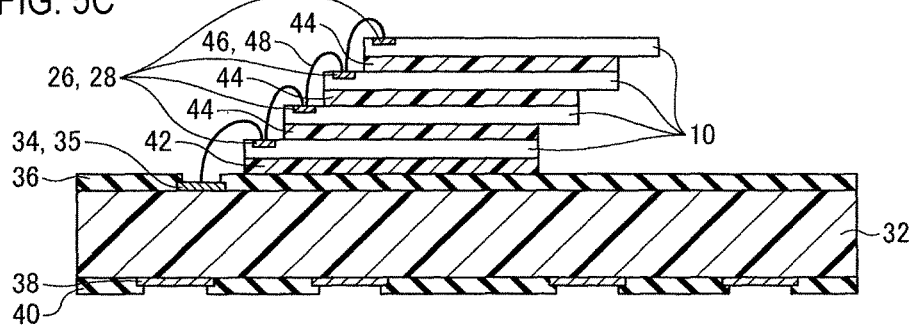

Moreover, the negative pad portions 28 of the plurality of stacked thin cells 10 and the electrode 35 of the circuit substrate 32 are connected to one another by the wire 48 using the wire bonding apparatus (FIG. 5C).

Figure 5D:
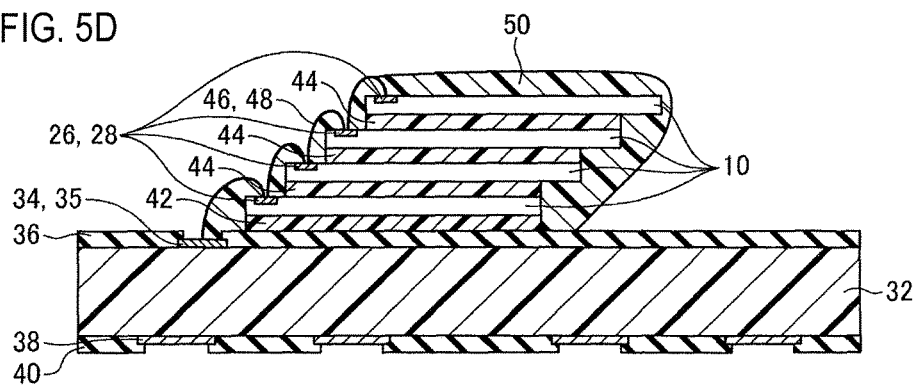

Next, the low-rigidity resin 50 is applied so as to cover the whole of the plurality of stacked thin cells 10, which are electrically connected to one another. The low-rigidity resin 50 covers the left side of the plurality of stacked thin cells 10, fills the inner side with respect to the wires 46, 48, and covers the upper and right sides of the plurality of stacked thin cells 10 (FIG. 5D). Next, the resulting stacked body is heated to, for example, 50 to 170° C. to cure the low-rigidity resin 50.

In this manner, the battery in which the plurality of thin cells are stacked with the low-rigidity resin between the thin cells is manufactured.

(Second Battery Manufacturing Method)

A second battery manufacturing method of the first embodiment will be described with reference to FIGS. 6A to 7C. FIGS. 6A to 7C are section views showing steps of the second battery manufacturing method of the first embodiment.

In the above-described first battery manufacturing method, the low-rigidity resin 44 is applied onto the upper surface of the fixed thin cell 10, i.e., the cell-formed surface where a cell portion is formed. Another thin cell 10 is placed on the low-rigidity resin 44, and the pressing and heating processes are then performed to cure the low-rigidity resin 44, to thereby stack the thin cells 10.

In the second battery manufacturing method, the low-rigidity resin 44 is applied onto the lower surface of the thin cell 10 which is to be stacked on the fixed thin cell 10, i.e., the surface opposite to the cell-formed surface where a cell portion is formed. The thin cell 10 is positioned and placed on the fixed thin cell 10, and the pressing and heating processes are then performed to cure the low-rigidity resin 44, to thereby stack the thin cells 10.

Figure 6A:
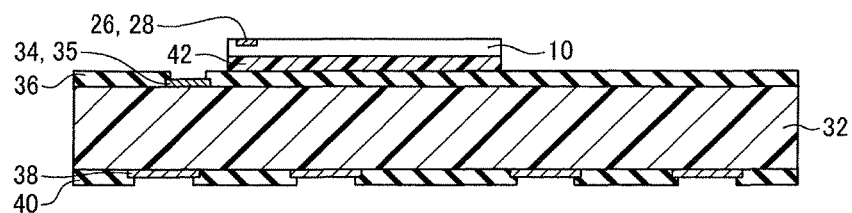
FIGS. 6A to 6D are section views (No. 1) showing steps of a second battery manufacturing method of the first embodiment.

First, the first thin cell 10 is bonded to the predetermined position on the upper surface of the circuit substrate 32 by the adhesive layer 42 (FIG. 6A).

Figure 6B:
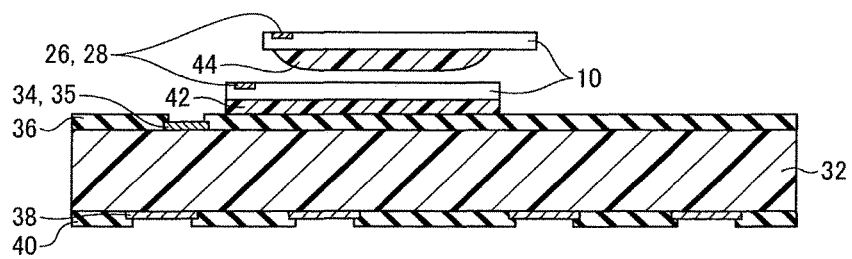

Next, the low-rigidity resin 44 is applied onto the lower surface of the second thin cell 10 which is to be stacked on the first thin cell 10 bonded to the circuit substrate 32, i.e., the surface opposite to the cell-formed surface where the cell portion is formed (FIG. 6B). For example, the second thin cell 10 which is to be stacked is inverted, and then the low-rigidity resin 44 is dripped thereonto.

Next, the second thin cell 10 is again inverted. Then, the second thin cell 10 is positioned while being shifted toward the right side on the sheet of FIG. 6B so that the positive pad portion 26 and negative pad portion 28 of the first thin cell 10 bonded to the circuit substrate 32 are exposed. Then, the second thin cell 10 is placed on the first thin cell 10 (FIG. 6B).

Figure 6C:
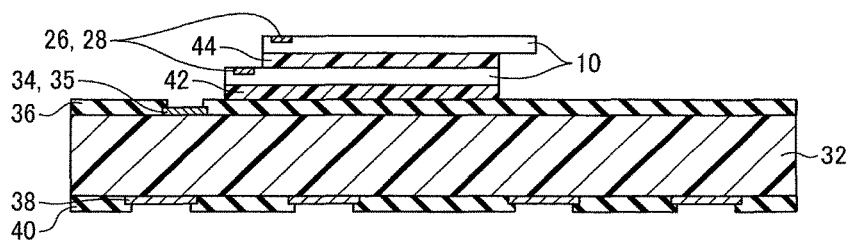

Next, the resulting stacked body is heated to, for example, 50 to 170° C. while pressing the placed second thin cell 10 from above, to cure the low-rigidity resin 44, so that the second thin cell 10 is stacked on the first thin cell 10 (FIG. 6C).

Figure 6D:
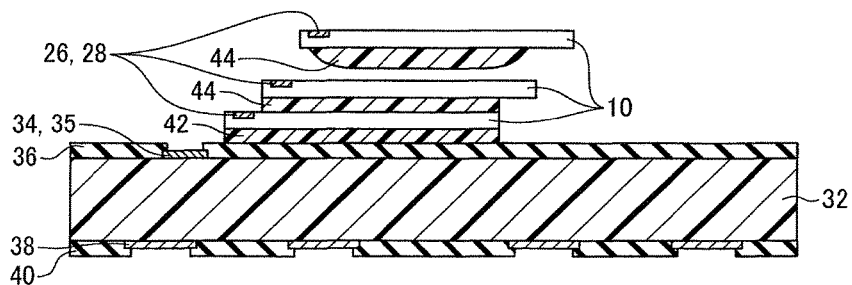

Next, the low-rigidity resin 44 is applied onto the lower surface of the third thin cell 10 which is to be stacked on the stacked second thin cell 10, i.e., the surface opposite to the cell-formed surface where the cell portion is formed (FIG. 6D). For example, the third thin cell 10 which is to be stacked is inverted, and then the low-rigidity resin 44 is dripped thereonto.

Next, the third thin cell 10 is again inverted. Then, the third thin cell 10 is positioned while being shifted toward the right side on the sheet of FIG. 6D so that the positive pad portion 26 and negative pad portion 28 of the second thin cell 10 are exposed. Then, the third thin cell 10 is placed on the second thin cell 10 (FIG. 6D).

Figure 7A:
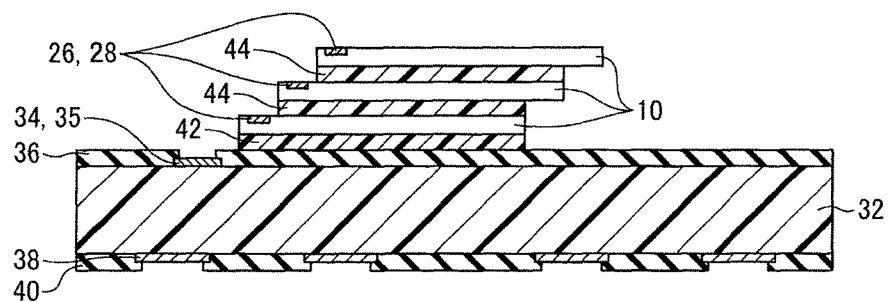
FIGS. 7A to 7C are section views (No. 2) showing steps of the second battery manufacturing method of the first embodiment.

Next, the resulting stacked body is heated to, for example, 50 to 170° C. while pressing the placed third thin cell 10 from above, to cure the low-rigidity resin 44, so that the third thin cell 10 is stacked on the second thin cell 10 (FIG. 7A).

Figure 7B:
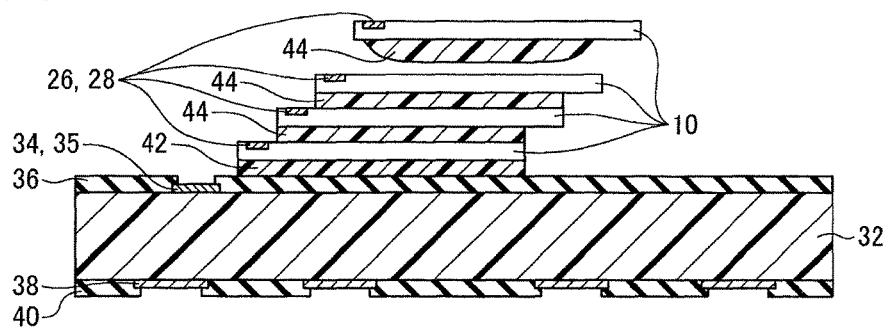

Next, the low-rigidity resin 44 is applied onto the lower surface of the fourth thin cell 10 which is to be stacked on the stacked third thin cell 10, i.e., the surface opposite to the cell-formed surface where the cell portion is formed (FIG. 7B). For example, the fourth thin cell 10 which is to be stacked is inverted, and then the low-rigidity resin 44 is dripped thereonto.

Next, the fourth thin cell 10 is again inverted. Then, the fourth thin cell 10 is positioned while being shifted toward the right side on the sheet of FIG. 7B so that the positive pad portion 26 and negative pad portion 28 of the stacked third thin cell 10 are exposed. Then, the fourth thin cell 10 is placed on the third thin cell 10 (FIG. 7B).

Figure 7C:
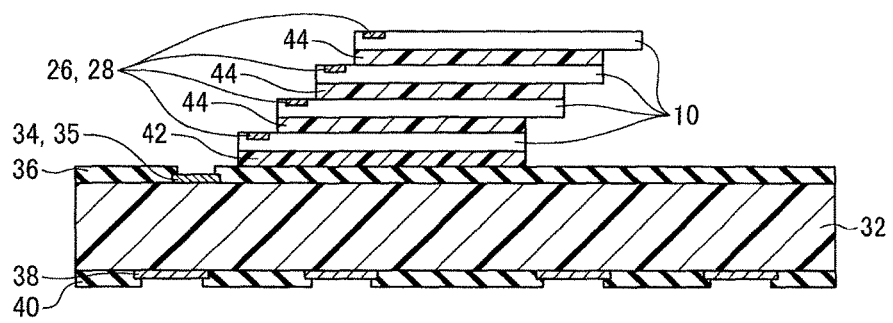

Next, the resulting stacked body is heated to, for example, 50 to 170° C. while pressing the placed fourth thin cell 10 from above, to cure the low-rigidity resin 44, so that the fourth thin cell 10 is stacked on the third thin cell 10 (FIG. 7C).

In a similar manner as the first battery manufacturing method, thereafter, the plurality of stacked thin cells 10 and the electrodes 34, 35 of the circuit substrate 32 are connected to one another by the wires 46, 48 (FIG. 5C). Next, the low-rigidity resin 50 is applied so as to cover the whole of the plurality of stacked thin cells 10, which are electrically connected to one another (FIG. 5D).

In this manner, the battery in which the plurality of thin cells are stacked with the low-rigidity resin between the thin cells is manufactured.

(Modification of Battery Manufacturing Method)

In the above-described first battery manufacturing method, the low-rigidity resin 44 is applied onto the upper surface of the fixed thin cell 10, i.e., the cell-formed surface. In the above-described second battery manufacturing method, the low-rigidity resin 44 is applied onto the lower surface of the thin cell 10 which is to be stacked on the fixed thin cell 10, i.e., the surface opposite to the cell-formed surface.

The battery manufacturing method is not limited to these methods. For example, the low-rigidity resin 44 may be applied onto the upper and lower surfaces of the thin cell 10 which is to be stacked on the fixed thin cell 10, i.e., both of the cell-formed surface and the surface opposite to the cell-formed surface. In this case, the low-rigidity resin 44 is applied onto the cell-formed surfaces of the thin cells 10 so as not to cover the positive pad portions 26 and the negative pad portions 28.

Alternatively, the low-rigidity resin 44 may be applied onto the whole surface of the thin cell 10 which is to be stacked on the fixed thin cell 10. In this case, the low-rigidity resin 44 is applied so as not to cover the positive pad portions 26 and negative pad portions 28 on the cell-formed surfaces of the thin cells 10.

In the above-described battery manufacturing methods (No. 1) and (No. 2), the low-rigidity resin 44 is applied by dripping it. However, the application method is not limited thereto.

For example, the low-rigidity resin 44 may be applied by pouring the low-rigidity resin 44 into a mold. Alternatively, the low-rigidity resin 44 may be formed by screen-printing the low-rigidity resin 44 or by pasting the low-rigidity resin film 44.

Alternatively, after a plurality of thin cells 10 are stacked with the low-rigidity resin 44 between the cells 10, the stacked thin cells 10 may be fixed to the circuit substrate 32 by the adhesive layer 42.

[Second Embodiment]

Figure 8:
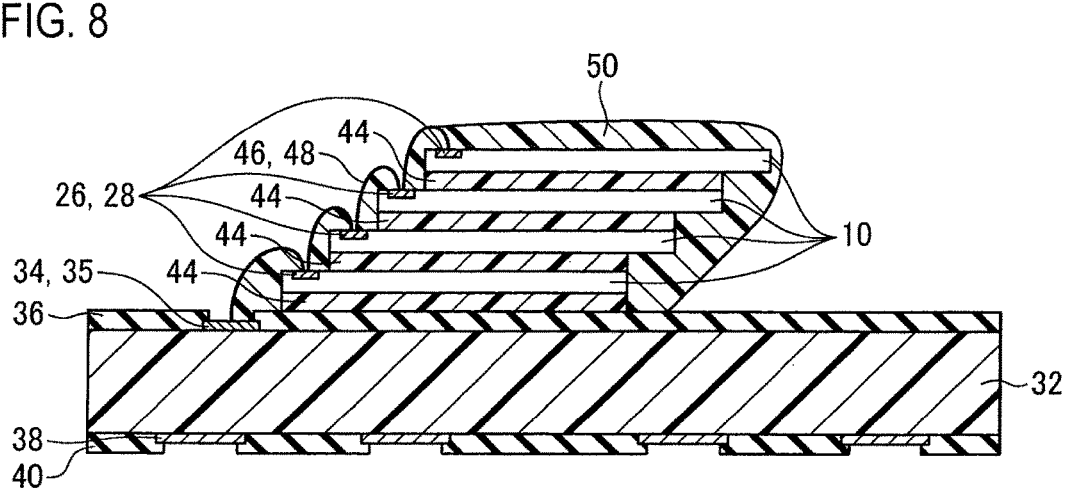
FIG. 8 is a section view showing a battery of a second embodiment.

A battery of a second embodiment will be described with reference to FIG. 8. FIG. 8 is a section view showing the battery of the second embodiment.

In the above-described first embodiment, the first thin cell 10 is bonded to the upper surface of the circuit substrate 32 by the adhesive layer 42, and the second and subsequent thin cells 10 are sequentially stacked on the bonded first thin cell 10 with the low-rigidity resin 44 between the thin cells 10.

In the second embodiment, the low-rigidity resin 44 is used also in bonding of the first thin cell 10 to the upper surface of the circuit substrate 32.

As shown in FIG. 8, the first thin cell 10 is bonded to a predetermined position on the upper surface of the circuit substrate 32 by the low-rigidity resin 44. The second and subsequent thin cells 10 are sequentially stacked, with the low-rigidity resin 44 between the thin cells 10, on the first thin cell 10 bonded to the upper surface of the circuit substrate 32. The thin cells 10 are stacked while being sequentially shifted toward the right side on the sheet of FIG. 8 so that the positive pad portions 26 and negative pad portions 28 which are located on the left sides of the thin cells 10 are not covered by the upper stacked thin cells 10. The low-rigidity resin 44 is interposed between the stacked thin cells 10.

The plurality of stacked thin cells 10 are electrically connected to one another by the wires 46, 48. The whole of the stacked thin cells 10 which are electrically connected to one another is covered by the low-rigidity resin 50.

The low-rigidity resin 44 which is provided between the circuit substrate 32 and the thin cell 10 and between the plurality of thin cells 10, and the low-rigidity resin 50 which covers the plurality of thin cells 10 are made of a resin having the rubber elasticity, such as silicone, urethane, or polyolefin.

Preferably, the low-rigidity resins 44, 50 have a low rigidity which is sufficient for absorbing the volume change of the thin cells 10 due to charging/discharging, i.e., have a sufficiently low tensile strength. For example, the tensile strengths of the low-rigidity resins 44, 50 are preferably in a range of 0.5 to 10.0 MPa.

According to the second embodiment, as described above, the plurality of thin cells are stacked with the low-rigidity resin between the thin cells, and the low-rigidity resin is also used in bonding of the first thin cell to the circuit board, to thereby make the low-rigidity resin more effectively absorb the volume change due to charging/discharging of the battery. Therefore, it is possible to realize a battery which can be more surely prevented from being broken, and which is more reliable.

[Third Embodiment]

Figure 9A:
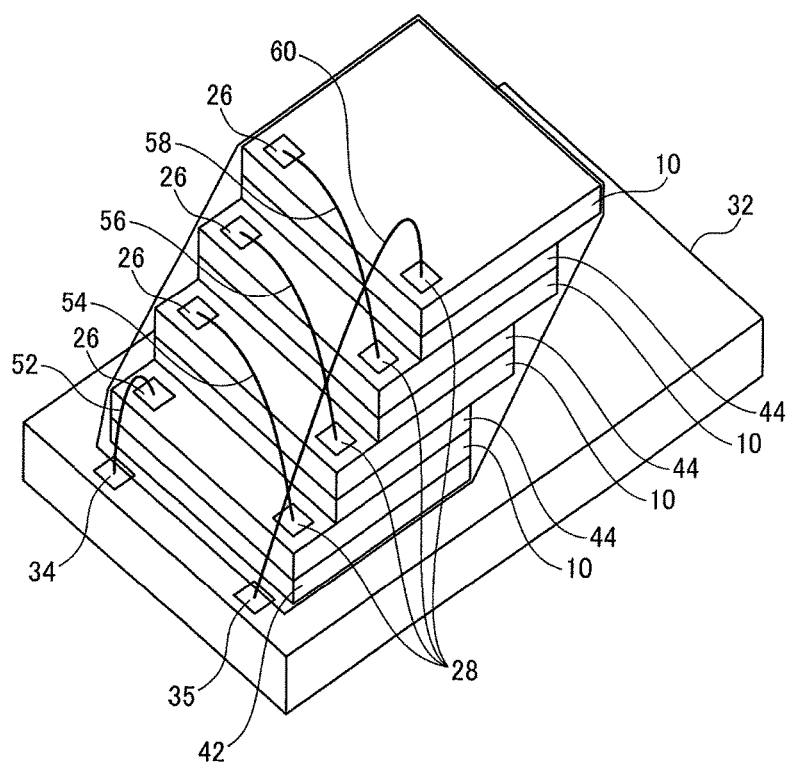
FIGS. 9A and 9B are a perspective view and circuit diagram showing a battery of a third embodiment, respectively.
Figure 9B:
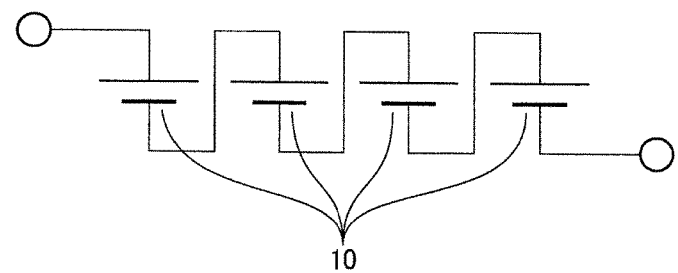

A battery of a third embodiment will be described with reference to FIGS. 9A and 9B. FIGS. 9A and 9B are a perspective view and circuit diagram showing the battery of the third embodiment, respectively.

In the above-described first embodiment, a large-capacity battery is realized by connecting the plurality of stacked thin cells 10 in parallel.

In the third embodiment, a high-voltage battery is realized by connecting the plurality of stacked thin cells 10 in series.

The plurality of stacked thin cells 10 are electrically connected to one another as shown in FIG. 9A. The electrode 34 of the circuit substrate 32 and the positive pad portion 26 of the lowermost first thin cell 10 of the plurality of stacked thin cells 10 are connected to each other by a wire 52. The negative pad portion 28 of the first thin cell 10 and the positive pad portion 26 of the second thin cell 10 are connected to each other by a wire 54. The negative pad portion 28 of the second thin cell 10 and the positive pad portion 26 of the third thin cell 10 are connected to each other by a wire 56. The negative pad portion 28 of the third thin cell 10 and the positive pad portion 26 of the uppermost fourth thin cell 10 are connected to each other by a wire 58. The negative pad portion 28 of the fourth thin cell 10 and the electrode 35 of the circuit substrate 32 are connected to each other by a wire 60.

As a result, the battery 30 of the third embodiment has a circuit configuration where the plurality of thin cells 10 are connected in series as shown in the circuit diagram of FIG. 9B.

The battery 30 of the third embodiment has, for example, about 15.2 volts in electromotive force and about 50 μAh in capacity.

As described above, the third embodiment provides a high-voltage battery in which the plurality of stacked thin cells 10 are connected in series.

The connection configuration (parallel connection) of the plurality of thin cells 10 in the first embodiment shown in FIG. 2B and the connection configuration (series connection) of the plurality of thin cells 10 in the third embodiment shown in FIG. 9A may be combined with each other. For example, partial ones of the plurality of thin cells 10 may be connected in series and then, plural sets of series-connected thin cells 10 may be connected in parallel to realize a battery having a desired electromotive force and a desired, capacity.

[Fourth Embodiment]

Figure 10A:
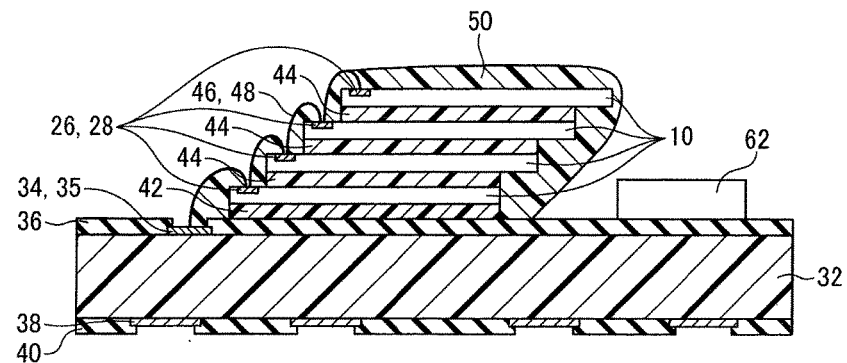
FIGS. 10A and 10B are a section view and circuit diagram showing a battery of a fourth embodiment, respectively.
Figure 10B:
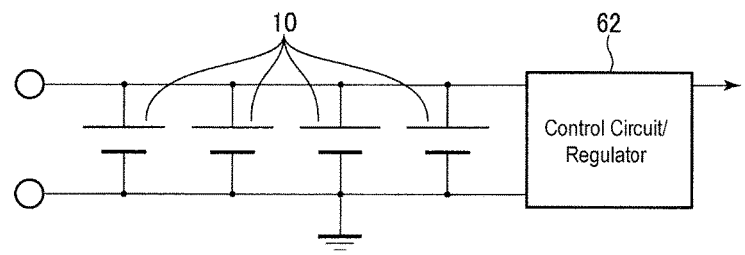

A battery of a fourth embodiment will be described with reference to FIGS. 10A and 10B. FIGS. 10A and 10B are a section view and circuit diagram showing the battery of the fourth embodiment, respectively.

The fourth embodiment is different from the first embodiment in that as shown in FIG. 10A, another circuit such as a control circuit/regulator 62 is provided on the circuit substrate 32 together with the plurality of stacked thin cells 10.

A regulator in the control circuit/regulator 62 is a circuit that generates a desired voltage with the battery. For example, a control circuit of the control circuit/regulator 62 is a circuit that charges/discharges the battery.

The control circuit/regulator 62 is electrically connected to, for example, the circuit substrate 32. The plurality of stacked thin cells 10 and the control circuit/regulator 62 are electrically connected to one another by, for example, the wirings of the circuit substrate 32.

As described above, the fourth embodiment provides a battery that incorporates peripheral circuits such as a regulator and a control circuit.

[Fifth Embodiment]

Figure 11:
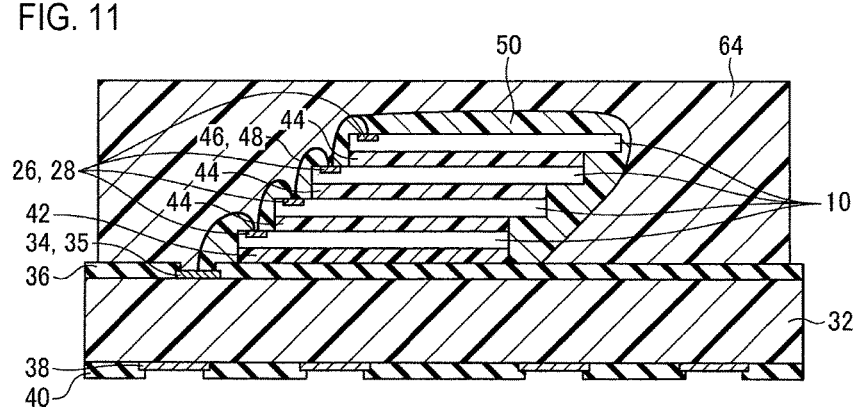
FIG. 11 is a section view showing a battery of a fifth embodiment.

A battery of a fifth embodiment will be described with reference to FIG. 11. FIG. 11 is a section view showing the battery of the fifth embodiment.

In the above-described first embodiment, the plurality of thin cells 10 are sequentially stacked on the circuit substrate 32 with the low-rigidity resin 44 between the thin cells 10, and the whole of the plurality of stacked thin cells 10 is covered by the low-rigidity resin 50. The low-rigidity resin 50 is suitable for absorbing the volume change due to charging/discharging of the battery, but may not always have sufficient strength.

In the fifth embodiment, as shown in FIG. 11, the plurality of stacked thin cells 10 which are covered by the low-rigidity resin 50 are further covered by an encapsulation resin 64.

For example, the encapsulation resin 64 is made of a molding resin such as epoxy.

The rigidity, i.e., the tensile strength of the encapsulation resin 64 is higher than the rigidities of the low-rigidity resins 44, 50. For example, the tensile strength of the encapsulation resin 64 is preferably 100 MPa or higher.

Examples of the encapsulation resin include not only the molding resin, but also a potting resin such as epoxy.

As described above, the fifth embodiment provides a battery having sufficient strength.

[Sixth Embodiment]

Figure 12:
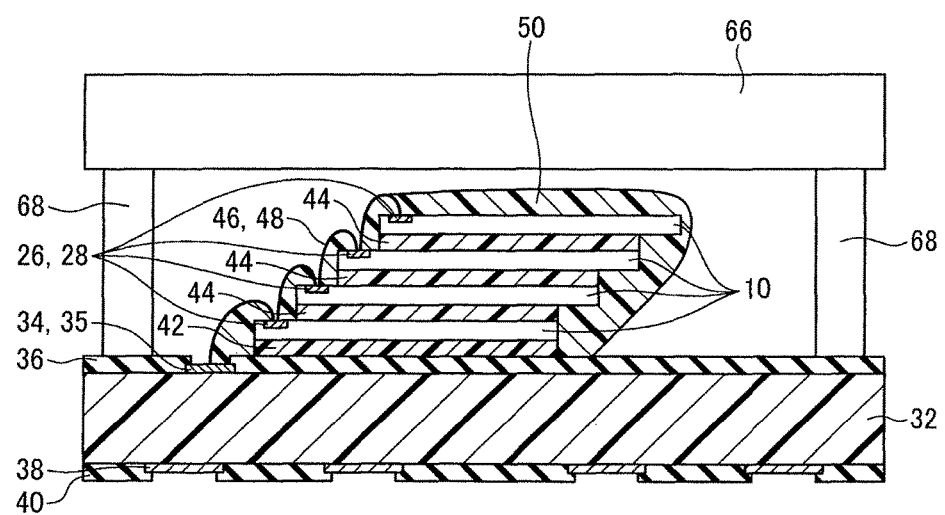
FIG. 12 is a section view showing a battery of a sixth embodiment.

A battery of a sixth embodiment will be described with reference to FIG. 12. FIG. 12 is a section view showing the battery of the sixth embodiment.

In the above-described first embodiment, the plurality of thin cells 10 are sequentially stacked on the circuit substrate 32 with the low-rigidity resin 44 between the thin cells 10, and the whole of the stacked thin cells 10 is covered by the low-rigidity resin 50. The low-rigidity resin 50 is suitable for absorbing the volume change due to charging/discharging of the battery, but may not always have sufficient strength.

In the sixth embodiment, as shown in FIG. 12, a module (member) 66 is disposed above the plurality of stacked thin cells 10 which are covered by the low-rigidity resin 50, so that the plurality of stacked thin cells 10 is protected by the module 66. The module 66 is supported by connectors 68 disposed on the circuit substrate 32. The module 66 is electrically connected by the connectors 68 to the circuit substrate 32.

Examples of the module 66 include a regulator that generates a desired voltage with the battery, a control circuit that charges/discharges the battery, and a circuit that is driven by the battery.

As described above, the sixth embodiment provides a battery having sufficient strength.

In the sixth embodiment, alternatively, a gap between the module 66 and the circuit substrate 32 in FIG. 12 may be sealed by a resin such as epoxy.

[Seventh Embodiment]

Figure 13A:
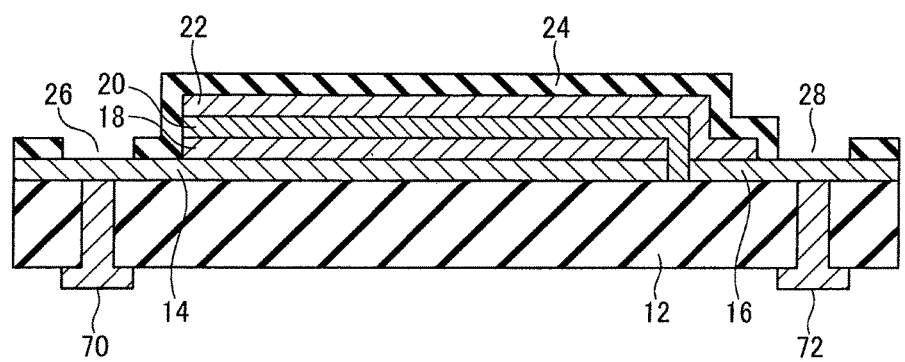
FIGS. 13A and 13B are section views showing a battery of a seventh embodiment.
Figure 13B:
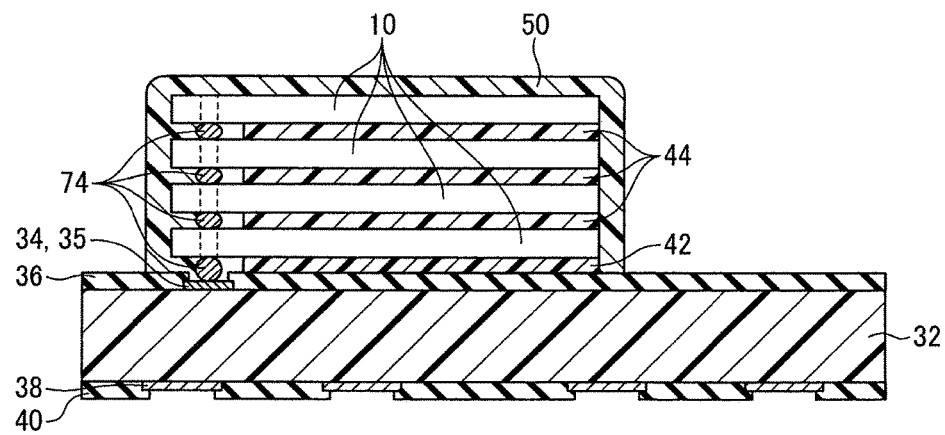

A battery of a seventh embodiment will be described with reference to FIGS. 13A and 13B. FIG. 13A is a section view showing a thin cell that is used in the battery of the seventh embodiment. FIG. 13B is a section view showing the battery of the seventh embodiment.

In the above-described first embodiment, the thin cells 10 are stacked while being sequentially shifted toward the right side on the sheet of the drawings so that the positive pad portions 26 and negative pad portions 28 which are placed on the left sides of the thin cells 10 on the sheet of the drawings are not covered by the thin cells 10 which are stacked on the thin cell 10.

In the seventh embodiment, the plurality of thin cells 10 are stacked in a straight upward direction without being positionally shifted.

In each of the thin cells 10, as shown in FIG. 13A, the anode current collector layer 14 and the cathode current collector layer 16 are formed on the supporting substrate 12.

The anode layer 18 is formed on the anode current collector layer 14. The electrolyte layer 20 is formed on the anode layer 18. The cathode layer 22 is formed on the electrolyte layer 20. The cathode layer 22 is connected to the cathode current collector layer 16.

The whole thin cell 10 is covered by the protective layer 24. A part of a region, over the anode current collector layer 14, of the protective layer 24 is opened, and the opened portion serves as the positive pad portion 26. Also, a part of a region, over the cathode current collector layer 16, of the protective layer 24 is opened, and the opened portion is serves as the negative pad portion 28.

Through electrodes 70, 72 are formed in the supporting substrate 12. The through electrode 70 is connected to the positive pad portion 26 of the anode current collector layer 14. The through electrode 72 is connected to the negative pad portion 28 of the cathode current collector layer 16. Therefore, the positive pad portion 26 and the negative pad portion 28 are provided on the upper and lower surfaces of the thin cell 10.

In the battery of the seventh embodiment, as shown in FIG. 13B, the plurality of thin cells 10 are stacked in the straight upward direction without being positionally shifted.

The first thin cell 10 is bonded to a predetermined position on the upper surface of the circuit substrate 32 by the adhesive layer 42. The thin cell 10 has a rectangular shape, and the positive pad portion 26 and the negative pad portion 28 are located on the upper and lower surfaces of the thin cell 10 in the vicinity of the left side of the thin cell 10 in FIGS. 13B.

On or above the first thin cell 10 bonded to the upper surface of the circuit substrate 32, the plurality of other thin cells 10 are sequentially stacked in the straight upward direction with the low-rigidity resin 44 between the thin cells 10. The low-rigidity resin 44 and conductive members 74 are interposed between the plurality of stacked thin cells 10. The plurality of stacked thin cells 10 are electrically connected to one another by the conductive members 74.

The whole of the plurality of stacked thin cells 10 which are electrically connected to one another are covered by the low-rigidity resin 50. The low-rigidity resin 50 covers the lateral side of the plurality of stacked thin cells 10 and fills inside the thin cells 10 up to the vicinities of the conductive members 74. Examples of the conductive members 74 include solder balls.

According to the seventh embodiment, as described above, the plurality of thin cells 10 are stacked in the straight upward direction. Therefore the strength of the battery can be improved.

[Modifications]

The above-described exemplary embodiments are mere examples, and various modifications may be made as required.

In the above-described exemplary embodiments, four thin cells are stacked. However, an arbitrary number of thin cells may be stacked as required.

Also, the thin cells in the above-described exemplary embodiments are illustrative only. Thin cells having another configuration may be employed.

Although the thin cells in the above-described exemplary embodiments are rechargeable thin cells, thin cells which are not rechargeable may be employed.

[Clauses]

This disclosure further encompasses various exemplary embodiments, for example, described below.

1. A method for manufacturing a battery, the method comprising:

stacking a plurality of cells on a supporting substrate with resin layers between the cells, wherein each resin layer includes a first resin, and the resin layers have 0.5 MPa to 10.0 MPa in tensile strength.

2. The method according to the clause 1, further comprising:

covering the stacked cells by a second resin having 0.5 MPa to 10.0 MPa in tensile strength.

3. A method for manufacturing a battery, the method comprising:

stacking a plurality of cells on a supporting substrate with resin layers between the cells, wherein each resin layer includes a first resin, and the resin layers has a smaller tensile strength than a bonding layer that fixes the stacked cells to the supporting substrate.

4. The method according to the clause 3, further comprising:

covering the stacked cells by a second resin having a smaller tensile strength than the bonding layer.

The exemplary embodiments have been described above in detail. It should be noted that the invention is not limited thereto. Various modifications and changes may be made within the scope of the spirit of the invention set forth in claims.

What is claimed is:

1. A battery comprising:
   a supporting substrate;
   resin layers each including a first resin and having 0.5 MPa to 10 MPa in tensile strength; and
   a plurality of cells that are stacked on the supporting substrate with the resin layers between the cells,
   wherein one of the cells is stacked on another one of the cells such that a portion of said another one of the cells is exposed from the one of the cells,
   each of the cells is electrically connected to an adjacent one of the cells via a wire, and
   each of the cells and wires is covered by a second resin having 0.5 MPa to 10 MPa in tensile strength.

2. The battery according to claim 1, further comprising:
   a member that is supported by the supporting substrate and that covers above the stacked cells.

3. The battery according to claim 1, wherein
   each of the cells comprises a substrate and an electrolyte layer provided above an upper surface of the substrate, and
   a lower surface of the substrate of a first cell of the plurality of cells is located above an upper surface of the electrolyte layer of a second cell of the plurality of cells.

4. A battery comprising:
   a supporting substrate;
   resin layers each including a first resin;
   a plurality of cells that are stacked on the supporting substrate with the resin layers between the cells; and a bonding layer that fixes the stacked cells to the supporting substrate, wherein
the resin layers have a smaller tensile strength than the bonding layer,
each of the cells is electrically connected to an adjacent one of the cells via a wire, and
each of the cells and wires is covered by a second resin having a smaller tensile strength than the bonding layer.

5. The battery according to claim 4, wherein
the resin layers have 0.5 MPa to 10 MPa in tensile strength, and
the bonding layer has 50 MPa or more in tensile strength.

6. The battery according to claim 4, further comprising:
a member that is supported by the supporting substrate and that covers above the stacked cells.

7. The battery according to claim 4, wherein one of the cells is stacked on another one of the cells so that the one cell and said another cell entirely overlap each other in plan view.

8. The battery according to claim 4, wherein
each of the cells comprises a substrate and an electrolyte layer provided above an upper surface of the substrate, and
a lower surface of the substrate of a first cell of the plurality of cells is located above an upper surface of the electrolyte layer of a second cell of the plurality of cells.

9. A battery comprising:
a supporting substrate;
resin layers each including a first resin;
a plurality of cells that are stacked on the supporting substrate with the resin layers between the cells; and
a bonding layer that fixes the stacked cells to the supporting substrate,
wherein the resin layers have a smaller tensile strength than the bonding layer,
wherein one of the cells is stacked on another one of the cells such that the one cell and said another cell partially overlap each other in plan view,
wherein each of the cells is electrically connected to an adjacent one of the cells via a wire, and
wherein each of the cells and wires is covered by a second resin having a smaller tensile strength than the bonding layer.

10. The battery according to claim 9, wherein
the resin layers have 0.5 MPa to 10 MPa in tensile strength, and
the bonding layer has 50 MPa or more in tensile strength.

11. The battery according to claim 9, further comprising:
a member that is supported by the supporting substrate and that covers above the stacked cells.

12. The battery according to claim 9, wherein
each of the cells comprises a substrate and an electrolyte layer provided above an upper surface of the substrate, and
a lower surface of the substrate of a first cell of the plurality of cells is located above an upper surface of the electrolyte layer of a second cell of the plurality of cells.

* * * * *